(12) United States Patent
LaMoore et al.

(10) Patent No.: US 11,546,187 B2
(45) Date of Patent: Jan. 3, 2023

(54) LARGE PACKET DAISY CHAIN SERIAL BUS

(71) Applicant: Graco Minnesota Inc., Minneapolis, MN (US)

(72) Inventors: Morgan O. LaMoore, Minneapolis, MN (US); Pavel V. Tysyachuk, Bloomington, MN (US); Adriana F. Mickols, Fridley, MN (US); Nicholas T. Fritz, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 468 days.

(21) Appl. No.: 16/715,750

(22) Filed: Dec. 16, 2019

(65) Prior Publication Data
US 2020/0192315 A1 Jun. 18, 2020

Related U.S. Application Data

(60) Provisional application No. 62/851,248, filed on May 22, 2019, provisional application No. 62/780,561, filed on Dec. 17, 2018.

(51) Int. Cl.
*H04L 12/40* (2006.01)
*G05B 19/042* (2006.01)
(Continued)

(52) U.S. Cl.
CPC ...... *H04L 12/4015* (2013.01); *G05B 19/0421* (2013.01); *G06F 13/4027* (2013.01);
(Continued)

(58) Field of Classification Search
CPC ............. G06F 13/4027; G06F 13/4282; G06F 13/4247; G05B 19/0421;
(Continued)

(56) References Cited

U.S. PATENT DOCUMENTS 6,665,742 B2 * 12/2003 Owen ..................... H04L 29/06
713/1
7,433,302 B2 10/2008 Allen
(Continued)

FOREIGN PATENT DOCUMENTS

EP 3166258 A1 5/2017

OTHER PUBLICATIONS

International Search Report and Written Opinion for International Patent Application PCT/US2019/066574, dated Feb. 13, 2020, 13 pages.

*Primary Examiner* — Glenn A. Auve
(74) *Attorney, Agent, or Firm* — Kinney & Lange, P.A.

(57) ABSTRACT

A communication system for an industrial process includes multiple slave modules connected in series with a master controller. The master controller stores a communication schedule that defines an ordered sequence of messages and identifiers associated with each message. The master controller transmits messages downstream through the slave modules to a terminal one of the slave modules. The terminal slave module generates a return message that is transmitted upstream to the master controller. Each slave module receives each downstream message, identifies based on the message identifier whether the message is associated with response information from the slave module, and inserts the response information into corresponding upstream messages.

20 Claims, 8 Drawing Sheets

(51) Int. Cl.
*G06F 13/40* (2006.01)
*G06F 13/42* (2006.01)

(52) U.S. Cl.
CPC ...... *G06F 13/4247* (2013.01); *G06F 13/4282* (2013.01); *G05B 2219/1215* (2013.01); *G05B 2219/2231* (2013.01); *H04L 2012/4026* (2013.01)

(58) Field of Classification Search
CPC .... G05B 2219/2231; G05B 2219/1215; H04L 12/4015; H04L 2012/4026
See application file for complete search history.

(56) References Cited

U.S. PATENT DOCUMENTS

| | | | |
|---|---|---|---|
| 8,428,054 B2 | 4/2013 | Miller | |
| 8,625,625 B2 | 1/2014 | Anderson et al. | |
| 8,650,304 B2 | 2/2014 | Anderson et al. | |
| 8,651,878 B2 | 2/2014 | Björklund | |
| 8,670,457 B2 | 3/2014 | Anderson et al. | |
| 8,937,966 B2 | 1/2015 | Kretschmann et al. | |
| 9,081,742 B2 | 7/2015 | Sonnier et al. | |
| 9,723,767 B2 | 8/2017 | Kojima et al. | |
| 9,768,572 B1 | 9/2017 | Gelineau et al. | |
| 9,960,997 B2 | 5/2018 | Balasubramanian et al. | |
| 2008/0052417 A1* | 2/2008 | Aoyama | H04L 1/0045 710/1 |
| 2010/0023657 A1* | 1/2010 | Fukuda | G06F 13/161 710/37 |
| 2012/0179849 A1* | 7/2012 | Mizutani | H04L 12/40013 710/110 |
| 2013/0301495 A1 | 11/2013 | Miller | |
| 2014/0254431 A1* | 9/2014 | Yan | H04Q 11/04 370/255 |
| 2016/0091903 A1 | 3/2016 | Patton et al. | |
| 2016/0205066 A1 | 7/2016 | Attarwala et al. | |
| 2017/0070564 A1 | 3/2017 | Sinistro et al. | |
| 2017/0222829 A1 | 8/2017 | Kessler et al. | |
| 2020/0076713 A1* | 3/2020 | Meyer | H04L 12/403 |

* cited by examiner

LARGE PACKET DAISY CHAIN SERIAL BUS

CROSS-REFERENCE TO RELATED APPLICATIONS

This application claims the benefit of U.S. Provisional Application No. 62/780,561 filed Dec. 17, 2018 for "LARGE PACKET DAISY CHAIN SERIAL BUS," which is hereby incorporated by reference in its entirety.

This application also claims the benefit of U.S. Provisional Application No. 62/851,248 filed May 22, 2019 for "LARGE PACKET DAISY CHAIN SERIAL BUS," which is hereby incorporated by reference in its entirety.

BACKGROUND

Industrial processes, such as industrial painting processes, industrial finishing processes, or other industrial processes often incorporate multiple sensors, actuators, and other devices that are interconnected to exchange information to automate one or more portions of the process. For instance, certain industrial painting processes include interconnected sensors and other devices to monitor and control process parameters, such as fluid pressures, flow rates, tank levels, agitator speeds, and other parameters associated with the painting process. The automated monitoring and control of process parameters can both increase the efficiency of the process and decrease system downtime.

Certain industrial processes, such as painting and finishing processes, can involve fumes or other combustible materials. As such, intrinsic safety of components within such processes is often an important consideration to limit electrical and thermal energy available for ignition. At the same time, as connectivity and the complexity of monitoring and control of industrial processes increases, the communication bandwidth utilized by such systems also increases. Accordingly, both intrinsic safety and communication bandwidth can be important aspects of a communication system that is used for monitoring and control of industrial process parameters.

SUMMARY

In one example, a communications system for an industrial process includes a master controller and a plurality of slave modules. The plurality of slave modules are connected in series with the master controller. The plurality of slave modules includes an initial slave module and a terminal slave module. The master controller is configured to store a communication schedule that defines an ordered sequence of messages and identifiers associated with each of the messages, and transmit the messages with the identifiers in a downstream direction through the initial slave module to the terminal slave module according to the communication schedule. The master controller is further configured to receive return messages originating from the terminal slave module and transmitted by the terminal slave module in an upstream direction through the initial slave module to the master controller. The initial slave module is configured to receive downstream messages, identify, based on the identifiers included in the downstream messages, whether the downstream messages are associated with response information from the respective slave module, and insert the response information into upstream messages having identifiers corresponding to the message identifiers in the downstream messages. The terminal slave module is configured to receive the downstream messages, generate the upstream messages having the identifiers that correspond to the identifiers included in the downstream messages, and transmit the upstream messages in the upstream direction.

In another example, a method for communicating in a communication system that includes a master controller and a plurality of slave modules connected in series with the master controller includes transmitting, according to a communication schedule stored in memory of the master controller, downstream messages and identifiers of the downstream messages in a downstream direction from the master controller through an initial slave module to a terminal slave module. The method further includes receiving the downstream messages at each of the plurality of slave modules as the messages are passed downstream, identifying, by each of the plurality of slave modules based on the identifiers included in the downstream messages, downstream messages that are associated with response information from the respective slave module, receiving the downstream messages at the terminal slave module, and generating, by the terminal slave module, upstream messages having identifiers that correspond to the identifiers included in the downstream messages. The method further includes transmitting the upstream messages from the terminal slave module in an upstream direction through the initial slave module to the master controller, inserting, by the plurality of slave modules, the response information into upstream messages having identifiers corresponding to the downstream messages identified as associated with response information from the respective slave module, and receiving the upstream messages at the master controller.

DETAILED DESCRIPTION

Figure 1:
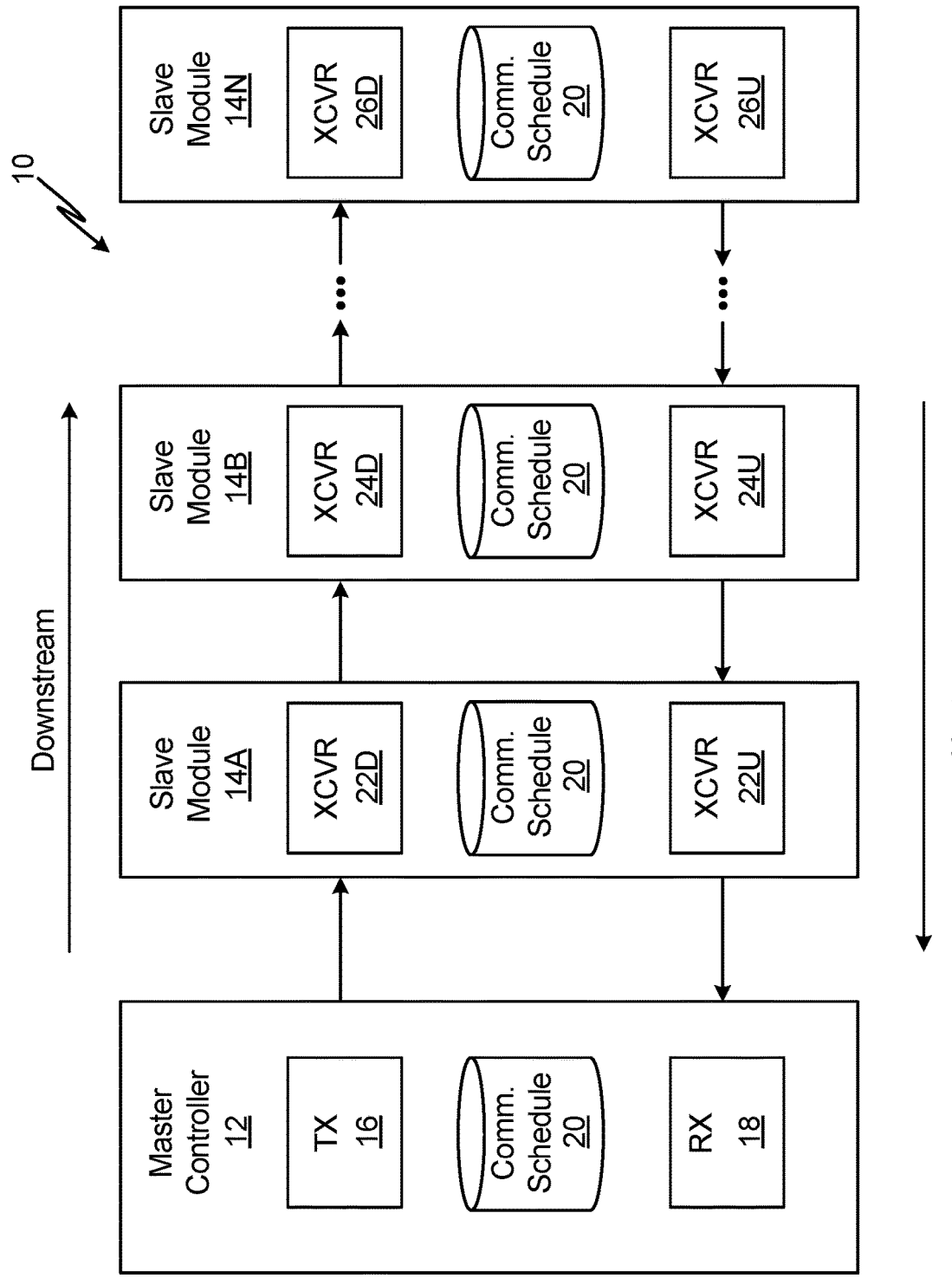
FIG. 1 is a schematic block diagram of an example communication system for use with an industrial process.

According to techniques of this disclosure, a communication system for use with an industrial process (e.g., a painting process, a finishing process, or other industrial process) enables high speed communication of large data packets between a master controller device and a plurality of slave modules. The plurality of slave modules can be (and/or be connected to) components of the industrial process, such as pressure transducers, pumps, actuators, valves, motors, fluid volume sensors, temperature sensors, or other components of an industrial process. The master controller and the slave modules are serially-connected in a daisy chain from the master controller device to a serially-last of the slave modules that is identified by the master controller during a module identification process (e.g., at system initialization or boot-up) and configured as a terminal slave module. Low voltage communication connections, such as one or more of serial communications, optical communications, or other low voltage communication connections can be utilized to facilitate the intrinsic safety of the system, such as for use with industrial processes that may involve combustible fumes (e.g., painting, finishing, or other such processes).

Messages originating from the master controller device travel in a downstream direction from the master controller through each of the plurality of slave modules to the terminal slave module. To increase data throughput, large data packets (e.g., 300 bytes, 500 bytes, or other sizes of data packets) are transmitted from the master controller at a rate of, e.g., one packet every millisecond. The master controller transmits the downstream messages according to a communication schedule that defines an ordered sequence of the messages. In some examples, each of the slave modules stores the communication schedule and utilizes the schedule to identify (and anticipate) received messages, thereby decreasing an amount of header information for each message and processing latency associated therewith, as well as increasing communication bandwidth of the system.

Messages originating from the master controller are received by each of the slave modules as the messages are passed downstream. Each of the slave modules identifies whether the message is associated with the respective slave module, parses and acts upon payload information included in the message, and prepares response information to be included in an upstream message to the master controller. The terminal slave module, in response to receiving a message, produces a new message having the message identifier (e.g., header information including the schedule identification of the message) and transmits the message as a response upstream through the plurality of slave modules to the master controller. Each of the slave modules receives the return messages as they are passed upstream and inserts response information to those messages associated with the respective slave module.

Accordingly, a communication system implementing techniques described herein enables high speed communication of large data packets between the master controller device and the plurality of slave modules. The use of the communication schedule, which can be stored by the master controller and each of the slave modules, enables messages to be directed to (e.g., associated with) multiple slave modules without requiring identification information for each slave module associated with each message to be included in the header information. Moreover, the use of the communication schedule can enable slave modules to efficiently identify and, in certain examples, anticipate the messages, thereby enabling quick response times by the slave modules to decrease processing latency of the system.

FIG. 1 is a schematic block diagram of communication system 10 that can be used with an industrial process, such as a painting process, a finishing process, or other industrial process. As illustrated in FIG. 1, communication system 10 includes master controller 12 and slave modules 14A-14N. Master controller 12 includes downstream transmitter 16 and upstream receiver 18, though in some examples, transmitter 16 and receiver 18 can be combined into a single transceiver. As illustrated in FIG. 1, master controller 12 further stores communication schedule 20, such as within computer-readable memory of master controller 12. In some examples, such as the example of FIG. 1, each of slave modules 14A-14N can also store communication schedule 20, such as in computer-readable memory of slave modules 14A-14N.

Each of slave modules 14A-14N includes a downstream transceiver and an upstream transceiver. That is, as illustrated in FIG. 1, slave module 14A includes downstream transceiver 22D and upstream transceiver 22U. Slave module 14B includes downstream transceiver 24D and upstream transceiver 24U. Slave module 14N includes downstream transceiver 26D and upstream transceiver 26U. It should be understood that, while downstream and upstream transceivers are illustrated in the example of FIG. 1 as separate components, such downstream and upstream transceivers can be implemented in a common communication bus that includes both downstream and upstream transceivers. For instance, downstream transceiver 22D and upstream transceiver 22U of slave module 14A can be implemented as part of a common communication bus that shares, for example, microprocessor(s) and/or computer-readable memory for transmitting downstream and upstream communications. Similarly, any one of slave modules 14B-14N can implement corresponding downstream and upstream transceivers using a common communication bus. Moreover, it should be understood that the letter N with respect to slave modules 14A-14N represents an arbitrary number, such that communication system 10 can include any number of slave modules 14A-14N.

Though not shown in the example of FIG. 1 for purposes of clarity and ease of illustration, master controller 12 and each of slave modules 14A-14N includes one or more processors and computer-readable memory. Examples of the one or more processors can include any one or more of a microprocessor, a digital signal processor (DSP), an application specific integrated circuit (ASIC), a field-programmable gate array (FPGA), or other equivalent discrete or integrated logic circuitry.

Computer-readable memory of master controller 12 and slave modules 14A-14N can be configured to store information within master controller 12 and slave modules 14A-14N during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of master controller 12 and slave modules 14A-14N can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories.

Master controller 12 can be a controller device configured to be communicatively coupled with components of communication system 10, such as slave modules 14A-14N, for monitoring and control of the components during operation of the industrial process. In some examples, master controller 12 includes and/or is operatively coupled to a display device and/or user interface elements (e.g., buttons, dials, graphical control elements presented at a touch-sensitive display, or other user interface elements) to enable user interaction with master controller 12, such as for initialization, monitoring, and/or control of the system. Though not illustrated in the example of FIG. 1, in certain examples, master controller 12 is communicatively coupled to one or more remote computing devices, such as via a wired or wireless communications network, or both. Slave modules 14A-14N can be (and/or be connected to) components of the industrial process, such as pressure transducers, pumps, actuators, valves, motors, fluid volume sensors, temperature sensors, or other components of an industrial process.

As illustrated in FIG. 1, master controller 12 and slave modules 14A-14N are electrically and/or communicatively coupled, in series, between master controller 12 and slave module 14N. Slave module 14A is connected to receive downstream communications from master controller 12 and to transmit the downstream communications to slave module 14B via downstream transceiver 22D. Slave module 14A is further connected to receive upstream communications from slave module 14B and to transmit the upstream communications to master controller 12 via upstream transceiver 22U. Slave module 14B is connected to receive downstream communications from slave module 14A and to transmit the communications in a downstream direction (e.g., to or toward slave module 14N) via downstream transceiver 24D. Slave module 14B is further connected to receive upstream communications from (or in a direction from) slave module 14N and to transmit the upstream communications to slave module 14A via upstream transceiver 24U. Slave module 14N is connected to receive downstream communications from (or in a direction from) slave module 14B via downstream transceiver 26D. Slave module 14N is further connected to transmit upstream communications to (or in a direction toward) slave module 14B via upstream transceiver 26U.

Slave module 14A, connected to master controller 12, can therefore be considered an initial slave module. Slave module 14N, located at a terminal end of the series of slave modules, can be considered a terminal slave module. Slave module 14B, connected between initial slave module 14A and terminal slave module 14N, can be considered an intermediate slave module. In some examples, such as when communication system 10 includes additional slave modules connected between slave module 14B and slave module 14N, the additional slave modules can also be considered intermediate slave modules. In certain examples, communication system 10 may not include slave module 14B or other intermediate slave modules connected between slave module 14A (e.g., an initial slave module) and slave module 14N (e.g., a terminal slave module). That is, in some examples, communication system 10 can include master controller 12 and only two slave modules, such as slave module 14A (e.g., an initial slave module) and slave module 14N (e.g., a terminal slave module).

Connections between master controller 12 and slave modules 14A-14N (i.e., between master controller 12 and slave module 14A, as well as between each of slave modules 14A and 14N) can take the form of serial communication connections (e.g., RS-232, RS-485, Serial Peripheral Interface (SPI), or other serial communication connections), optical interface connections, or other forms of communications. In some examples, the use of low-voltage communication interfaces, such as serial interface communications and optical interface communications, can facilitate the intrinsic safety of communications system 10 to limit electrical and/or thermal energy in the presence of, e.g., fumes or other hazardous materials. In certain examples, the communication connections can include a combination of connection types, such as both serial communications and optical communications (e.g., for communications between hazardous and non-hazardous locations). Accordingly, transceiver 16 and receiver 18 of master controller 12, as well as transceivers 22D, 22U, 24D, 24U, 26D, and 26U of slave modules 14A-14N can take the form of any transceiver (or other combination of transmitter and receiver) capable of sending and receiving data according to the communication connections between corresponding modules.

In operation, master controller 12 transmits messages via transmitter 16 in a downstream direction through initial slave module 14A to terminal slave module 14N. In examples where communication system 10 includes intermediate slave modules connected between initial slave module 14A and terminal slave module 14N (e.g., intermediate slave module 14B or other intermediate slave modules), master controller 12 transmits the messages in the downstream direction through initial slave module 14A to terminal slave module 14N via the intermediate slave modules. In examples where communication system 10 does not include intermediate slave modules connected between initial slave module 14A and terminal slave module 14N, master controller 12 transmits the messages via transmitter 16 in the downstream direction through initial slave module 14A to terminal slave module 14N without passing the messages through any intermediate slave modules. Master controller 12 transmits the messages according to communication schedule 20 stored at, e.g., computer-readable memory of master controller 12. Communication schedule 20 defines an ordered sequence of messages and identifiers associated with each of the messages. Communication schedule 20 can define an ordered sequence of, e.g., tens, hundreds, thousands, or other numbers of messages. Each of the messages can be associated with one or more of slave modules 14A-14N.

Messages defined by communication schedule 20 can include both header information and message payload information. Header information can include, e.g., a message class identifier to define a message type. Example message types can include, but are not limited to, an emergency class type, a module identification class type, a module configuration class type, a module schedule class type, a command class type, a status class type, and a bootloader class type. The message class identifier can take the form of, e.g., a sequence of bits (e.g., four bits) or other identifier. Header information can also include, in some examples, header payload information. For instance, header payload information can take the form of a sequence of bits (or other identifier) to identify a destination module, such as a unique identifier of any of slave modules 14A-14N. In some examples, header payload information can identify (e.g., via a bit sequence), a schedule identifier of the corresponding message, such as an indication of the order number of the message within the ordered sequence of messages defined by communication schedule 20. In some examples, header payload information can include additional information, such as optional bits to define additional information associated with the message. In certain examples, message headers include sixteen bits of information, four bits defining a message class type and the remaining twelve bits defining header payload information, though other header sizes are possible. In some examples, header information can include message length information that identifies an amount of data (e.g., a number of bits, a number of bytes, or other indications of an amount or length of the data) included in the message.

Message payload information includes command and/or request information associated with one or more of slave modules 14A-14N. Message payload information can include, e.g., command information to control operation of actuators, valves, pumps, or other components connected to slave modules 14A-14N, and/or requests for status, position, or other information from the components connected to slave modules 14A-14N.

Message payload information can include information associated with any one or more of slave modules 14A-14N. For example, message payload information can include 300 bytes, 400 bytes, 500 bytes, or other amounts of payload information, the payload information corresponding to one or multiple of slave modules 14A-14N. The location of the information corresponding to each associated one of slave modules 14A-14N within the message payload information can be defined by communication schedule 20. For instance, communication schedule 20 can define, for each of the ordered sequence of messages, each one of slave modules 14A-14N that is associated with a respective message, as well as a location within the message (e.g., a memory offset value from a defined location within the message, such as a start of the message, a start of the message payload, or other defined location) that corresponds to message payload information associated with the respective slave module. Communication schedule 20 can further define, in some examples, a local memory address of the corresponding one of slave modules 14A-14N associated with the message, a size of the payload information associated with the message corresponding to the respective slave module (e.g., a length of the portion of the message associated with the slave module), and a memory offset value within upstream messages at which the respective slave module is to insert response information into an upstream message.

As illustrated in FIG. 1, each of slave modules 14A-14N can store communication schedule 20 within computer-readable memory of the respective slave module. In some examples, master controller 12 can transmit communication schedule 20 to each of slave modules 14A-14N, such as during a system initialization mode of operation. In certain examples, master controller 12 can determine communication schedule 20 based on the identity and relative locations of slave modules 14A-14N in the serial connection between master controller 12 and terminal slave module 14N. For instance, master controller 12 can identify the identity and relative location (e.g., order of the serial connection) of each of slave modules 14A-14N during a module identification process, as is further described below.

In operation, downstream messages transmitted by master controller 12 are received by each of slave modules 14A-14N as the downstream messages are passed from master controller 12 to slave module 14N. Each of slave modules 14A-14N identifies the message based on the identifier included with the message by master controller 12, for example within header information of the message indicating the message class type as a command message and the schedule identifier indicating the order number of the message within the ordered sequence of messages defined by communication schedule 20.

Each of slave modules 14A-14N determines, based on communication schedule 20 stored at the respective slave module, whether the message is associated with the respective slave module. In response to determining that the respective slave module is not associated with the message, the respective slave module transmits the message downstream. In response to determining that the respective slave module is associated with the message, the slave module identifies, using communication schedule 20, a location within the message at which information corresponding to the slave module is located, retrieves the information from the corresponding location, identifies whether the slave module is associated with response information (and a location within upstream messages at which the slave module is to insert the response information), and transmits the message downstream. In those cases where the respective slave module is associated with response information for the message, the slave module begins queuing the response information for insertion into a corresponding upstream response message, as is further described below.

Slave module 14N, in the example of FIG. 1, is configured as a terminal slave module (i.e., a serially-last slave module). As such, in response to receiving a downstream message originating from master controller 12, slave module 14N generates a new response message corresponding to the received downstream message. For example, slave module 14N can generate a new response message having header information that identifies the message class as a response (or status) message and includes the schedule identifier of the received downstream message. Slave module 14N, in some examples, can insert response information into the response message (as defined by communication schedule 20), and transmit the response message upstream through the intermediate slave modules (slave module 14B in this example) and the initial slave module (slave module 14A in this example) to master controller 12. In examples where communication system 10 does not include intermediate slave module 14B (or other intermediate slave modules), terminal slave module 14N transmits the response message in the upstream direction through initial slave module 14A to master controller 12 without passing the message through any intermediate slave modules.

The upstream response message is received by each of the slave modules as it is passed upstream to master controller 12. Each respective slave module identifies the message based on the identifier included with the message, such as the schedule identifier included in the header information. Each respective slave module inserts response information into the upstream messages having message identifiers that correspond to previously-received downstream messages that are associated with response information from the respective slave module. Response information is inserted into the upstream message at a location defined by communication schedule 20 stored in the computer-readable memory of the respective slave module.

Accordingly, communication system 10 enables high speed communication of large data packets (e.g., between 300 bytes and 500 bytes) between master controller 12 and slave modules 14A-14N. The use of communication schedule 20 enables downstream messages to include less header information than would otherwise be required to address each message to multiple slave modules, thereby reducing processing latency of the system and increasing system communication bandwidth. In addition, slave modules 14A-14N, including separate upstream and downstream transceivers, can send and receive information simultaneously and asynchronously, thereby further increasing communication bandwidth of the system by enabling slave modules 14A-14N to prepare response information for insertion into upstream communications prior to receiving a corresponding upstream response.

Figure 2:
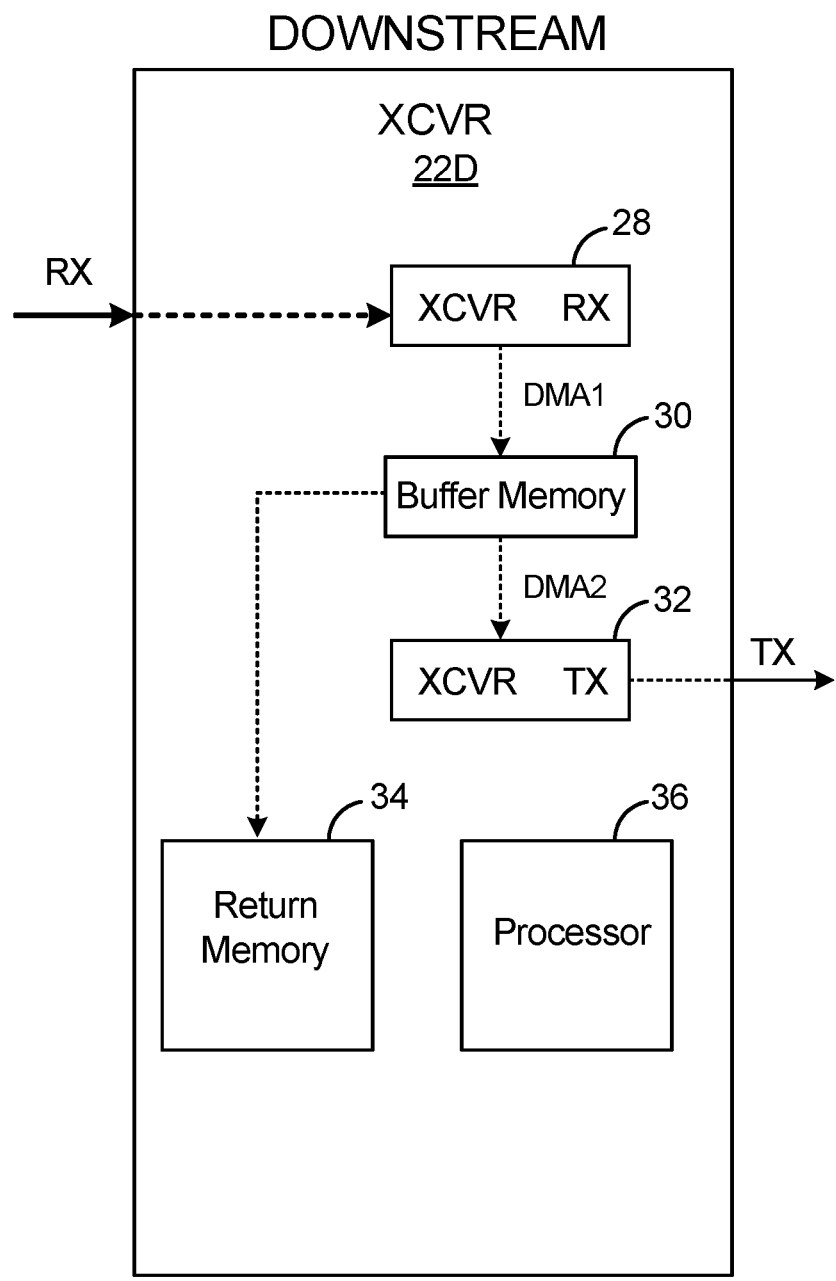
FIG. 2 is a schematic block diagram illustrating further details of a transceiver to receive and transmit downstream communications.

FIG. 2 is a schematic block diagram illustrating further details of downstream transceiver 22D of slave module 14A (FIG. 1) to receive and transmit downstream communications. While the example of FIG. 2 is described below with respect to downstream transceiver 22D, it should be understood that the techniques of FIG. 2 are applicable to any of downstream transceivers 22D, 24D, and 26D.

As illustrated in FIG. 2, downstream transceiver 22D includes receive buffer 28, buffer memory 30, transmit buffer 32, return memory 34, and processor 36. Downstream communication data received by downstream transceiver 22D is passed to receive buffer 28. Data within receive buffer 28 is moved to buffer memory 30 using direct memory access (DMA), illustrated in FIG. 2 as DMA1 (e.g., a first DMA). The memory location within buffer memory 30 is automatically incremented by DMA1 and the size of the memory is set to a DMA block that is larger than a defined size of incoming messages (e.g., 300 bytes, 500 bytes, or other sizes of messages). An event is triggered, e.g., as managed by processor 36, when memory transfer from receive buffer 28 to buffer memory 30 is initiated. The triggered event increments a byte counter and a second DMA transfer (illustrated in FIG. 2 as DMA2) moves data from buffer memory 30 to transmit buffer 32. Data within buffer memory 30 is transmitted downstream toward terminal slave module 14N (FIG. 1).

The byte counter is configured to interrupt after a first threshold number of bytes is received, the first threshold number of bytes corresponding to a defined size of header information included at a beginning of downstream communications (e.g., one byte, two bytes, or other whole or fractional numbers of bytes). In some examples, processor 36 performs a cyclical redundancy check (CRC) on the received header information and payload information against a fixed-length check value (e.g., a bit sequence) included in the header information. In response to determining that the check value satisfies the CRC, processor 36 parses the received header information to identify the schedule identifier of the message that indicates the order of the message within the ordered sequence of messages defined by communication schedule 20 (FIG. 1). In response to determining that the check value does not satisfy the CRC, processor 36 can transmit the received message downstream without further processing or can refrain from both processing the message and transmitting the message downstream.

Processor 36 identifies, based on information included in communication schedule 20, a starting location of information within the message that is associated with slave module 14A and a length (or size) of the data within the message associated with slave module 14A. The byte counter is reconfigured to interrupt after the length (or size) of the data within the message associated with slave module 14A is received, and data within the received message from the starting location to the identified length (or size) is moved into memory during the interrupt for processing by slave module 14A.

Figure 3:
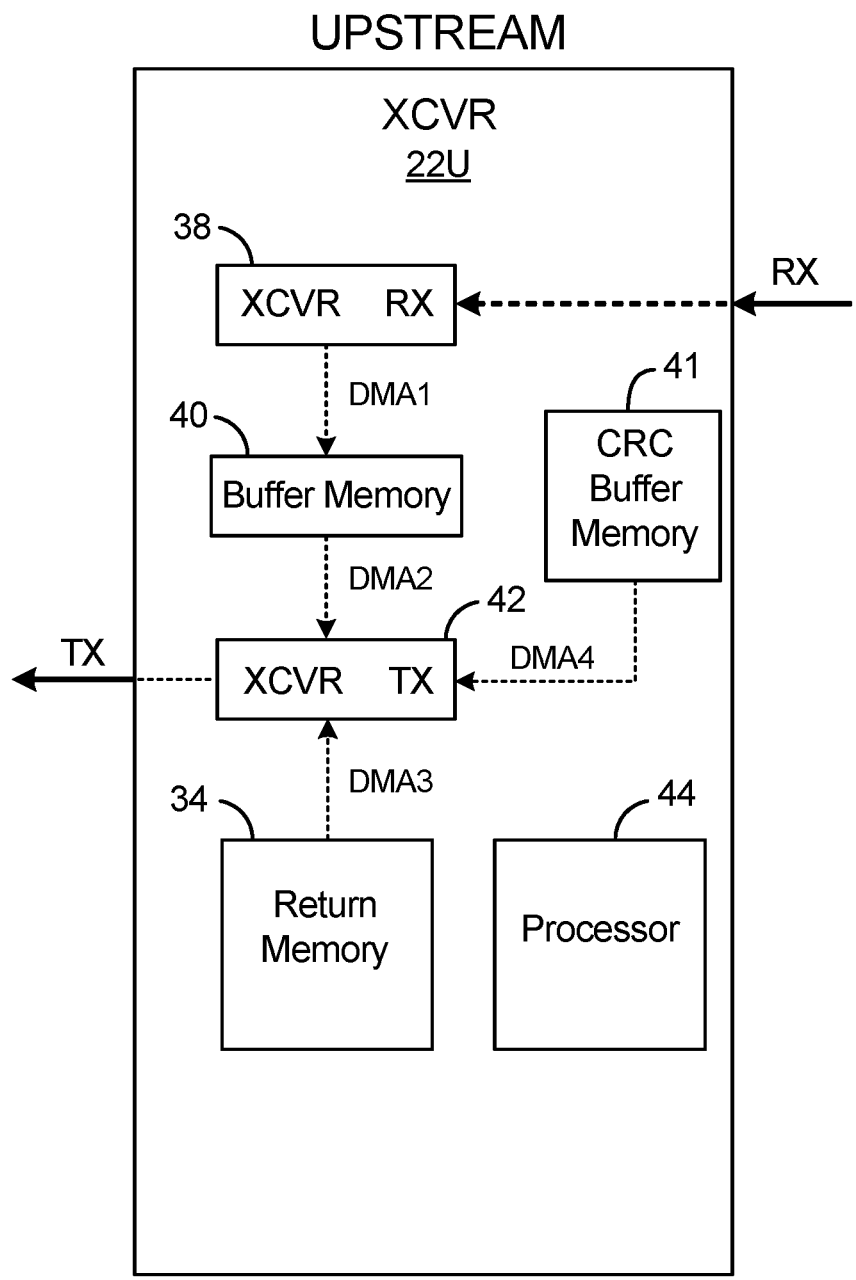
FIG. 3 is a schematic block illustrating further details of a transceiver to receive and transmit upstream communications.

FIG. 3 is a schematic block diagram illustrating further details of upstream transceiver 22U of slave module 14A (FIG. 1) to receive and transmit upstream communications. While the example of FIG. 3 is described below with respect to upstream transceiver 22U, it should be understood that the techniques of FIG. 3 are applicable to any of upstream transceivers 22U, 24U, and 26U.

As illustrated in FIG. 3, upstream transceiver 22U includes receive buffer 38, buffer memory 40, CRC buffer memory 41, transmit buffer 42, and processor 44. In the example of FIG. 3, upstream transceiver 22U shares return memory 34 with downstream transceiver 22D (e.g., implemented as part of a common communications bus), though in other examples, upstream transceiver 22U can include separate return memory, the information within return memory of downstream transceiver 22D being moved to the separate return memory by, e.g., a processor of slave module 14A. Similarly, though upstream transceiver 22U is illustrated as having processor 44 that is separate from processor 36 (FIG. 2) of downstream transceiver 22D, in other examples, upstream transceiver 22U and downstream transceiver 22D can share a common processor.

Upstream data received by upstream transceiver 22U is passed to receive buffer 38. Data within receive buffer 38 is moved to buffer memory 40 using DMA, illustrated in FIG. 3 as DMA1 The memory location within buffer memory 38 is automatically incremented by the DMA and the size of the memory is set to a DMA block that is larger than a defined size of incoming messages (e.g., 300 bytes, 500 bytes, or other sizes). An event is triggered, e.g., as managed by processor 44, when memory transfer from receive buffer 38 to buffer memory 40 is initiated. The triggered event increments a byte counter and a second DMA transfer (illustrated in FIG. 3 as DMA2) moves data from buffer memory 40 to transmit buffer 42. Data within buffer memory 42 is transmitted upstream toward master controller 12 (FIG. 1).

The byte counter is configured to interrupt after a first threshold number of bytes is received, the first threshold number of bytes corresponding to a defined size of header information included at a beginning of upstream communications (e.g., one byte, two bytes, or other whole or fractional numbers of bytes). Processor 44 identifies, based on information included in communication schedule 20, a starting location within the upstream message that is associated with return information for slave module 14A and a length (or size) of the associated return information. The byte counter is reconfigured to interrupt after a second threshold number of bytes are received, the second threshold number of bytes corresponding to a number of bytes between the starting location of the upstream message and the location within the message associated with slave module 14A. In response to the interrupt, a length of data associated with the return information is transferred from return memory 34 to transmit buffer 42. In some examples, DMA2 is reconfigured (e.g., by processor 44) to transfer the data from return memory 34 to transmit buffer 42. In other examples, such as the example of FIG. 3, a third DMA (illustrated as DMA3) is utilized to transfer the data from return memory 34 to transmit buffer 42. The byte counter is again reconfigured to interrupt after a third threshold number of bytes, the third threshold number of bytes corresponding to the length of data (i.e., number of bytes of data) associated with the return information.

Data within transmit buffer 42 is also moved to CRC buffer memory 41. Processor 44 performs a CRC on data within transmit buffer 42 (i.e., data moved to transmit buffer 42 from buffer memory 40 via DMA 1 and data moved to transmit buffer 42 from return memory 34 via DMA3). The interrupt after transfer of data from transmit buffer 42 initiates a DMA transfer of the calculated CRC to transmit buffer 42 (e.g., at the end of the upstream message or at another defined location within transmit buffer 42), illustrated in FIG. 3 as DMA 4. In addition, processor 44 compares the calculated CRC against CRC criteria, such as a fixed-length check value included in the received upstream message data.

In response to determining that the calculated CRC does not satisfy the CRC criteria, processor 44 causes transfer of a failure node identifier (FNID) corresponding to slave module 14A from CRC buffer memory to transmit buffer 42 (e.g., at a location after the calculated CRC or at another defined location within transmit buffer 42). The failure node identifier corresponding to slave module 14A identifies slave module 14A and indicates that upstream communications through transceiver 22U of slave module 14A did not satisfy the CRC check, therefore indicating that communications from slave module 14A may include erroneous communications data. In response to determining that the calculated CRC satisfies the CRC criteria, processor 44 does not cause the transfer of the failure node identifier corresponding to transceiver 22U to transmit buffer 42.

In certain examples, each of transceivers slave modules 14A-14N can insert a separate failure node identifier in response to determining that communications through the respective one of transceivers 22U-26U did not satisfy the CRC criteria. In other examples, each of slave modules 14A-14N can update a single failure node identifier (e.g., a single location within corresponding upstream communications) with a failure node identifier corresponding to the respective one of slave modules 14A-14N. In such examples, the failure node identifier received at master controller 12 (FIG. 1) can indicate the one of slave modules 14A-14N that is furthest upstream (e.g., nearest to master controller 12 in the communications path) and is associated with potentially erroneous communication data. Master controller 12 can, in certain examples, utilize communication data received from those of slave modules 14A-14N that are upstream of the slave module corresponding to the failure node identifier, and can ignore (or otherwise refrain from utilizing) data received from those of slave modules 14A-14N that are downstream of the slave module corresponding to the failure node identifier. Data within transmit buffer 42, including CRC and failure node identification data, is transmitted as part of the upstream message.

FIGS. 4A-4E are schematic block diagrams illustrating an example module identification process for use with communication system 10. As illustrated and described with respect to the examples of FIGS. 4A-4E, master controller 12 can identify a relative location of slave modules 14A-14N within the serial connection of slave modules 14A-14N (i.e., an order of the serial connections of slave modules 14A-14N) as well as identity information (e.g., a type, model, serial number, or other identity information) of slave modules 14A-14N. In addition, master controller 12 can determine which of slave modules 14A-14N is a serially-last of slave modules 14A-14N, and can configure the serially-last of slave modules 14A-14N as a terminal slave module that generates return messages and transmits the return messages upstream. As such, the techniques of FIGS. 4A-4E enable any number and any type of slave modules to be connected in series with master controller 12 without pre-provisioning slave modules 14A-14N or master controller 12 with the connection order. Moreover, any one of slave modules 14A-14N can be configured to act as a terminal slave module, such configuration being activated by master controller 12 based on the connection order implemented for the specific application and/or industrial process.

The identification process described with respect to FIGS. 4A-4E can be implemented by master controller 12 during, e.g., an initialization phase of operation of communication system 10, such as during boot-up or power-on of master controller 12. In some examples, the identification process can be repeated during operation of communication system 10 to identify whether new slave modules have been added, whether any of slave modules 14A-14N have been removed, and/or whether any of the slave modules are in a failure state or otherwise unable to communicate.

Figure 4A:
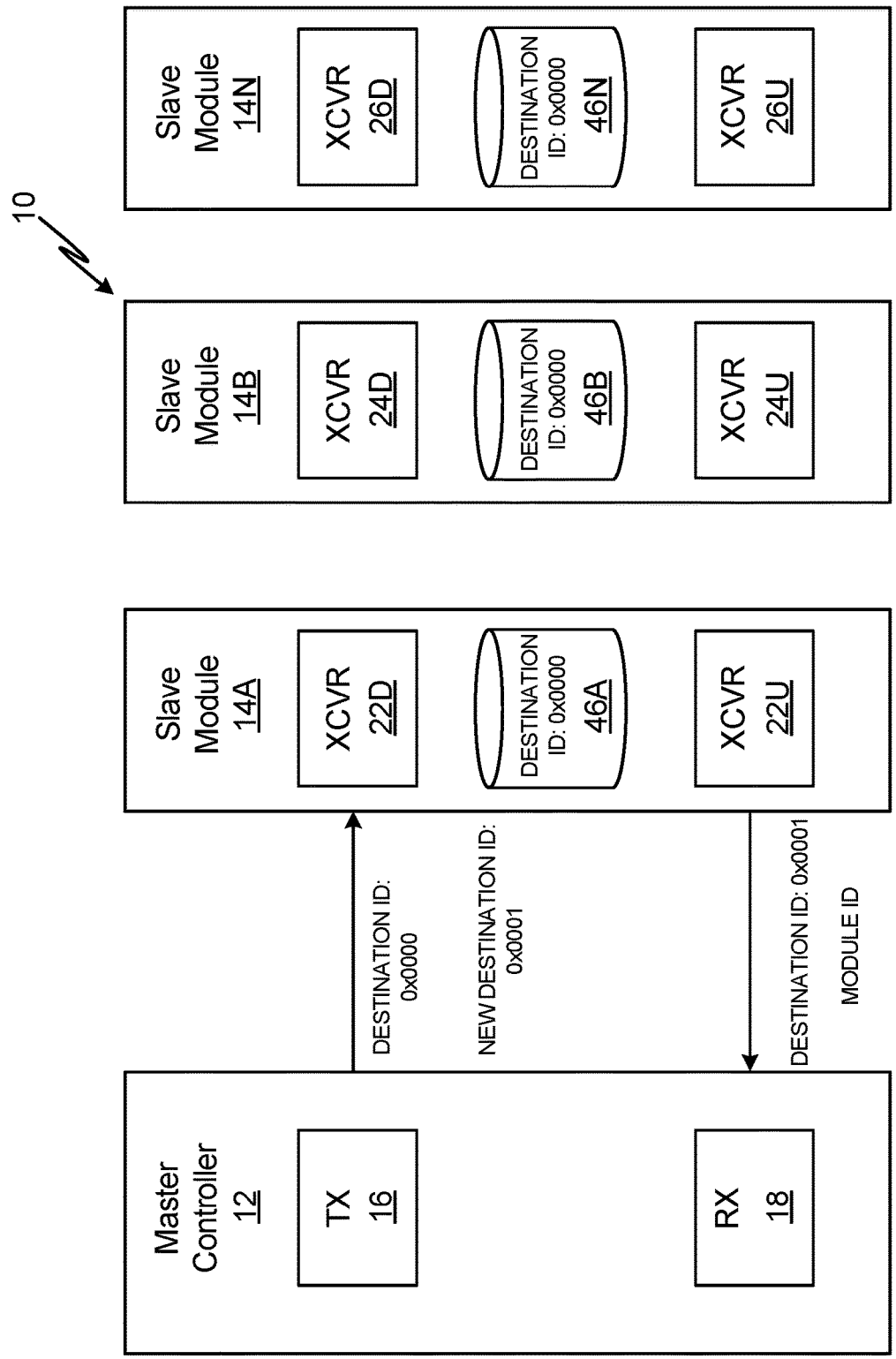
FIGS. 4A-4E are schematic block diagrams illustrating an example module identification process for use with the communication system.

Each of slave modules 14A-14N can store, e.g., at computer-readable memory, a destination identifier that identifies the respective slave module. For example, as illustrated in FIG. 4A, slave module 14A can store destination identifier (ID) 46A, slave module 14B can store destination ID 46B, and slave module 14N can store destination ID 46N. Destination IDs 46A-46N serve as unique identifiers of the respective slave modules within communication system 10. As such, master controller 12 can, in some examples, transmit messages downstream that include header information identifying a corresponding one of slave modules 14A-14N via destination IDs 46A-46N.

The example of FIG. 4A illustrates communication system 10 in an initial state, e.g., prior to initialization by master controller 12. As illustrated in FIG. 4A, each of slave modules 14A-14N can be pre-provisioned to store a destination ID having a defined value that corresponds to an uninitialized (or unidentified) module. For instance, as in the example of FIG. 4A, each of slave modules 14A-14N can be pre-provisioned to store a destination ID having a hexadecimal value of 0x0000, though any defined identifier (using any alphanumeric code) can be pre-defined as corresponding to an uninitialized module.

To identify and initialize slave modules 14A-14N, master controller 12 transmits an identification message downstream that is addressed to the defined destination ID corresponding to uninitialized modules (0x0000, in this example). For instance, master controller 12 can transmit a message downstream having header information that identifies the message as an identification class type (e.g., a bit sequence defined as an identification class type message) and a destination ID corresponding to uninitialized modules. In addition, the identification class type header information can include a commanded destination ID. Slave modules 14A-14N can be configured to store (e.g., in memory) the commanded destination ID as the destination ID associated with the respective slave module.

Slave modules 14A-14N can be configured to respond to identification class messages having a destination ID that matches the destination ID stored at the respective slave module without re-transmitting the identification class message downstream. Slave modules 14A-14N can be further configured to re-transmit downstream those identification class messages that do not match the destination ID stored at the respective slave module, and to re-transmit upstream all received upstream identification class messages.

Responses to identification class modules, as illustrated in FIG. 4A, can include the newly-stored destination ID of the respective slave module, as well as identity information of the respective slave module. Identity information can include, e.g., module type information, module version information, module serial number information, or other information identifying the respective slave module.

As illustrated in the example of FIG. 4A, in response to receiving the identification class message transmitted downstream by master controller 12 having the destination ID corresponding to uninitialized modules (0x0000, in this example), slave module 14A determines that the destination ID 0x0000 matches the value of destination ID 46A stored in memory of slave module 14A. Slave module 14A, in this example, identifies the commanded destination ID within the received message as having a hexadecimal value of 0x0001. Slave module 14A stores the value of 0x0001 as destination ID 46A and transmits the newly-stored value of 0x0001 and identity information of slave module 14A upstream to master controller 12.

Master controller 12, in response to receiving the response message from slave module 14A, stores the destination ID 0x0001 and the received identity information of slave module 14A received in the response within memory of master controller 12. Master controller 12 can identify the relative order of slave modules 14A-14N in the series connection as the order of identity information received during the initialization process. As such, master controller 12 can identify (and store) the identity information received from slave module 14A as a serially-first slave module (i.e., an initial slave module) within the series connection of slave modules 14A-14N.

Figure 4B:
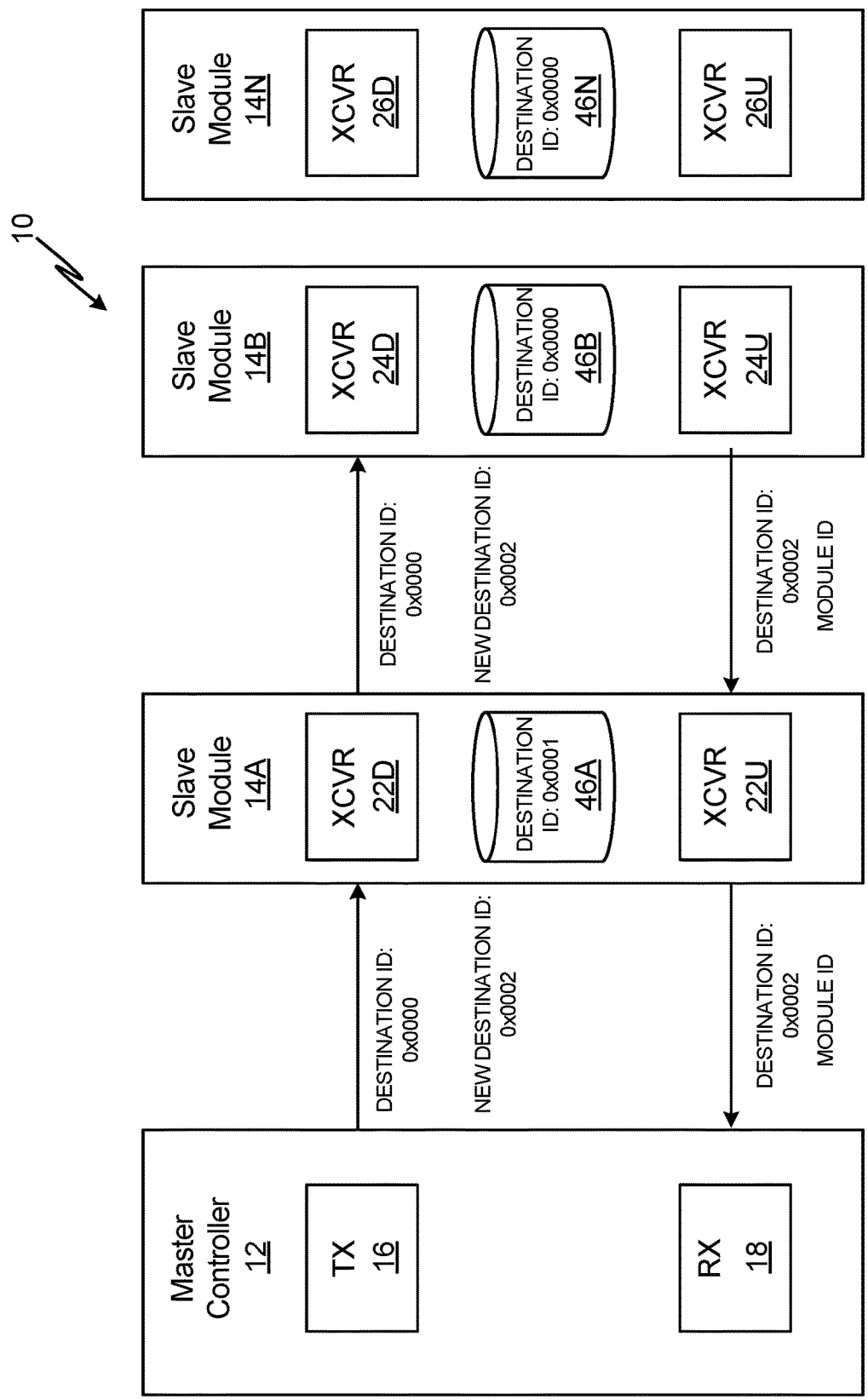

As illustrated in FIG. 4B, slave module 14A stores destination ID 46A having a value of 0x0001 according to the commanded destination ID transmitted to slave module 14A in the example of FIG. 4A. Master controller 12, in response to receiving the response message from slave module 14A, transmits a new identification class message downstream. The new identification class message includes the destination ID defined as corresponding to uninitialized modules and a commanded destination ID that is different than the destination ID associated with slave module 14A. For instance, as illustrated in FIG. 4B, master controller 12 can transmit the identification message including a destination ID having a value of 0x0000 (i.e., corresponding to uninitialized modules in this example) and a commanded destination ID having a value of 0x0002. Though the example of FIG. 4B illustrates master controller 12 as incrementing the commanded destination ID by a value of one, it should be understood that any unique commanded destination ID can be utilized (i.e., any commanded destination ID that is not associated with a slave module within memory of master controller 12).

Slave module 14A, in the example of FIG. 4B, receives the identification class message including the destination ID having a value of 0x0000, compares the destination ID to the stored value of destination ID 46A, and determines that the destination ID included in the downstream message does not match the stored value of destination ID 46A (i.e., a value of 0x0001 in this example). In response, slave module 14A re-transmits the identification class message downstream.

Slave module 14B, as illustrated in FIG. 4B, receives the identification class message from slave module 14A and compares the value of the destination ID included in the message to the value of destination ID 46B stored in memory of slave module 14B. In this example, slave module 14B determines that the value of the destination ID included in the downstream message (i.e., 0x0000) matches the stored value of destination ID 46B (i.e., 0x0000). In response, slave module 14B stores the value of 0x0002 as destination ID 46B, and transmits the newly-stored value of 0x0002 and identity information of slave module 14B upstream toward master controller 12. Slave module 14A receives the upstream identification class message and re-transmits the message upstream to master controller 12.

Master controller 12, in response to receiving the response message from slave module 14B, stores the destination ID 0x0002 and the received identity information of slave module 14B within memory of master controller 12. Master controller 12 further identifies slave module 14B as next in the relative order of the plurality of slave modules in the series connection (i.e., next with respect to slave module 14A identified as serially-first in the example of FIG. 4A).

Figure 4C:
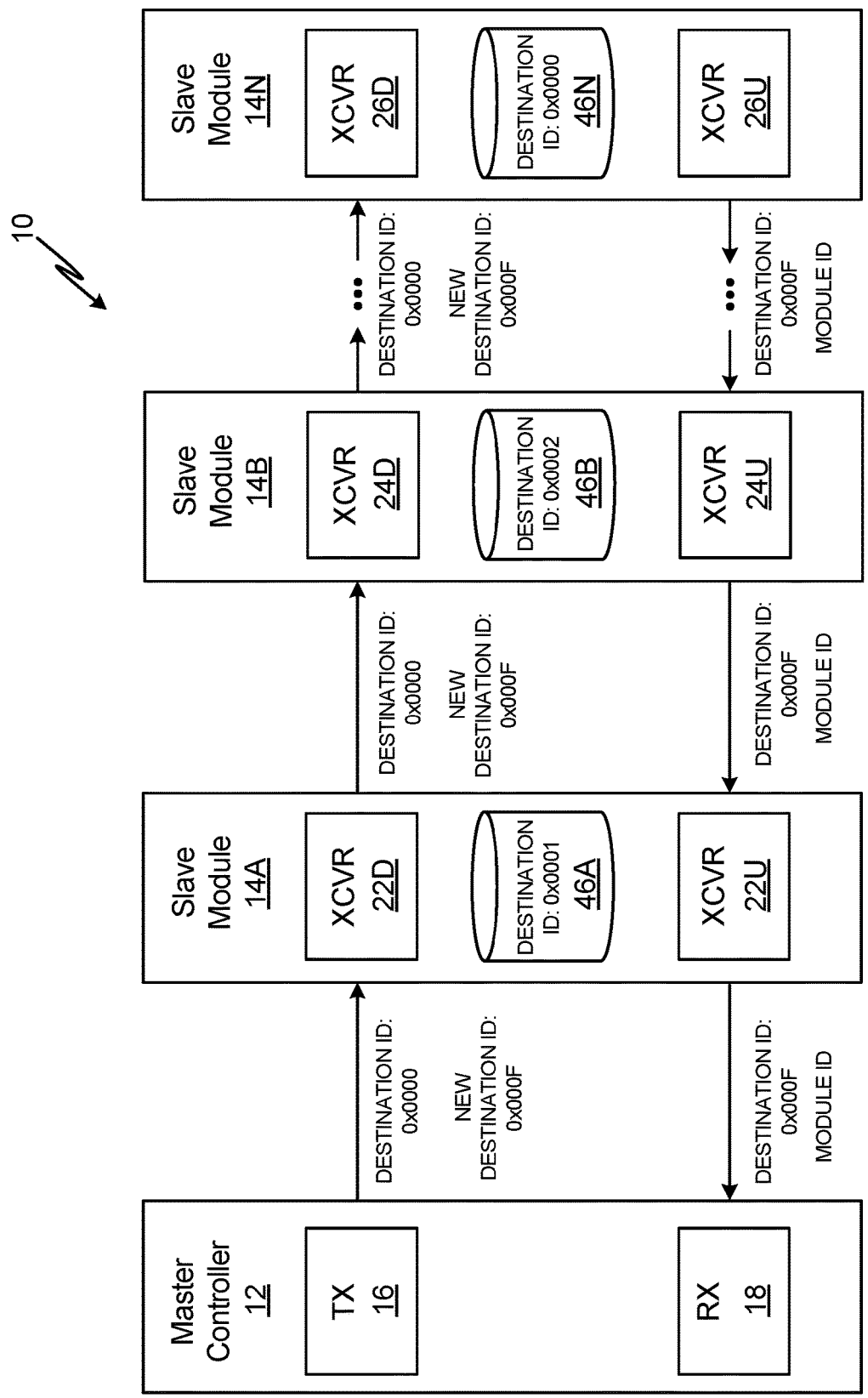

As illustrated in FIG. 4C, slave module 14A stores destination ID 46A having a value of 0x0001, and slave module 14B stores destination ID 46B having a value of 0x0002. Master controller 12, in response to receiving the response message from slave module 14B, transmits a new identification class message downstream. The new identification class message includes the destination ID having a value of 0x0000, defined in this example as corresponding to uninitialized modules, as well as a commanded destination ID having a hexadecimal value of 0x000F (i.e., corresponding to decimal value fifteen). Slave module 14A receives the downstream identification class message, determines that the included destination ID (0x0000) does not match the stored value of destination ID 46A (i.e., 0x0001), and re-transmits the message downstream. Slave module 14B receives the downstream identification class message, determines that the included destination ID (0x0000) does not match the stored value of destination ID 46B (0x0002), and re-transmits the message downstream. Slave module 14N receives the downstream identification class message, determines that the included destination ID (0x0000) matches the stored value of destination ID 46N (0x0000). In response, slave module 14N stores the value of the commanded destination ID (0x000F) as destination ID 46N, and transmits a response upstream, the response including the value of the newly-stored destination ID (0x000F) and identity information of slave module 14N.

Slave modules 14B and 14A, in turn, receive the upstream identification class message and re-transmit the message upstream. Master controller 12 receives the upstream response and stores the destination ID 0x000F and the received identity information of slave module 14N within memory of master controller 12. Master controller 12 further identifies slave module 14N as next in the relative order of the plurality of slave modules 14A-14N.

Figure 4D:
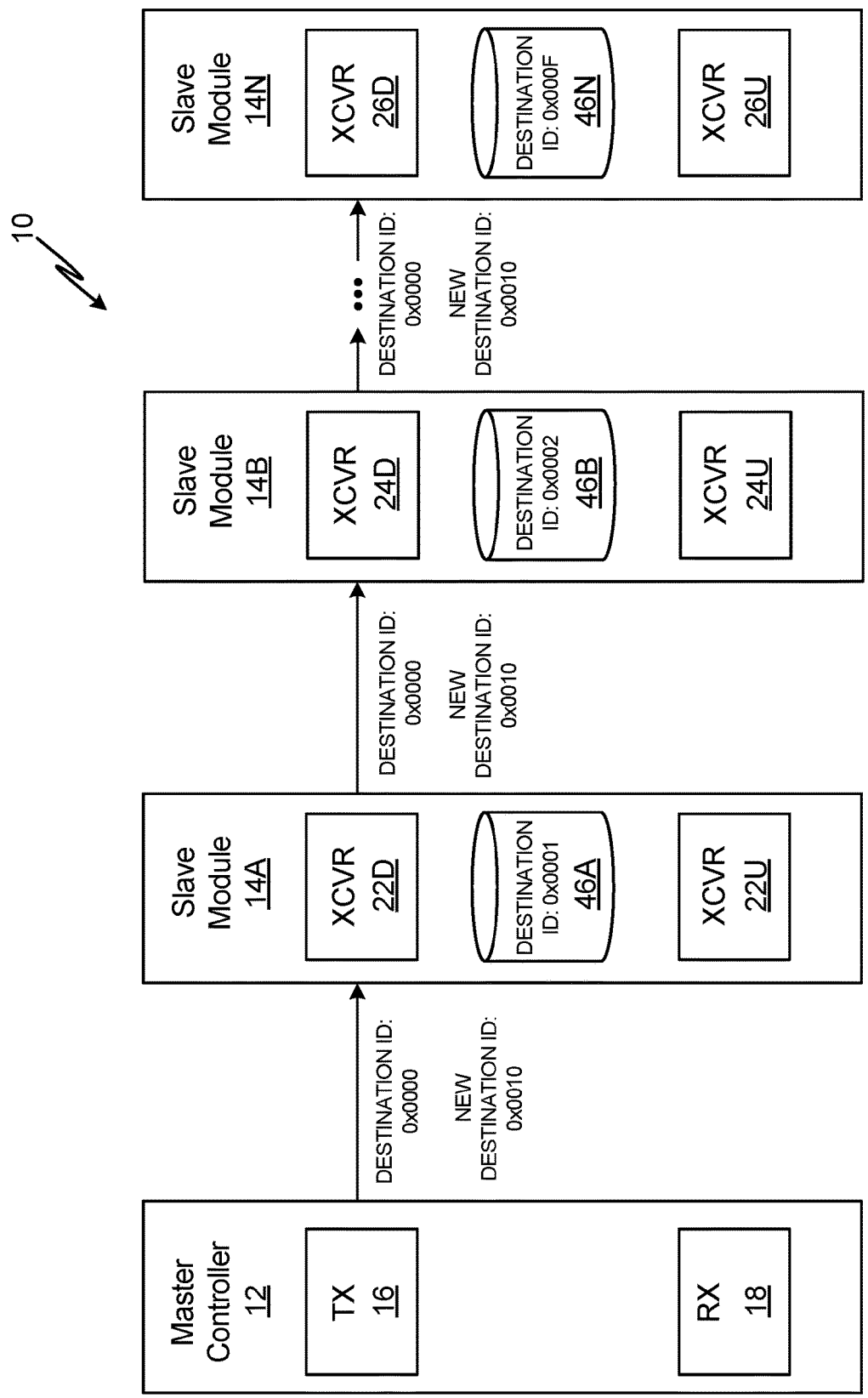

As illustrated in FIG. 4D, slave module 14A stores destination ID 46A having a value of 0x0001, slave module 14B stores destination ID 46B having a value of 0x0002, and slave module 14N stores destination ID 46N having a value of 0x000F. Master controller 12, in response to receiving the response message from slave module 14N, transmits a new identification class message downstream. The new identification class message includes the destination ID having a value of 0x0000, defined in this example as corresponding to uninitialized modules, as well as a commanded destination ID having a hexadecimal value of 0x0010 (i.e., corresponding to decimal value sixteen).

Each of slave modules 14A-14N receives the downstream identification class message, determines that the included destination ID (0x0000) does not match the stored value of the destination ID for the respective slave module, and retransmits the message downstream. Slave module 14N, in the example of FIG. 4D, is the serially-last slave module, and is therefore not connected to any downstream slave module. As such, no slave module responds to the downstream message in this example, and no upstream response is transmitted to master controller 12.

Master controller 12, in response to determining that a threshold amount of time has elapsed without receiving a response message (e.g., one second, two seconds, three seconds, or other threshold amounts of time), can determine that slave module 14N (i.e., a last slave module to respond) is the serially-last slave module. In some examples, master controller 12 can retransmit the identification class message having the destination ID corresponding to uninitialized modules once, twice, three times, or more, to determine whether a response is received within the threshold amount of time. In response to determining that slave module 14N (i.e., the last slave module to respond) is the serially-last slave module, master controller 12 stores the destination ID corresponding to slave module 14N (0x000F in this example) as corresponding to a terminal slave module.

Figure 4E:
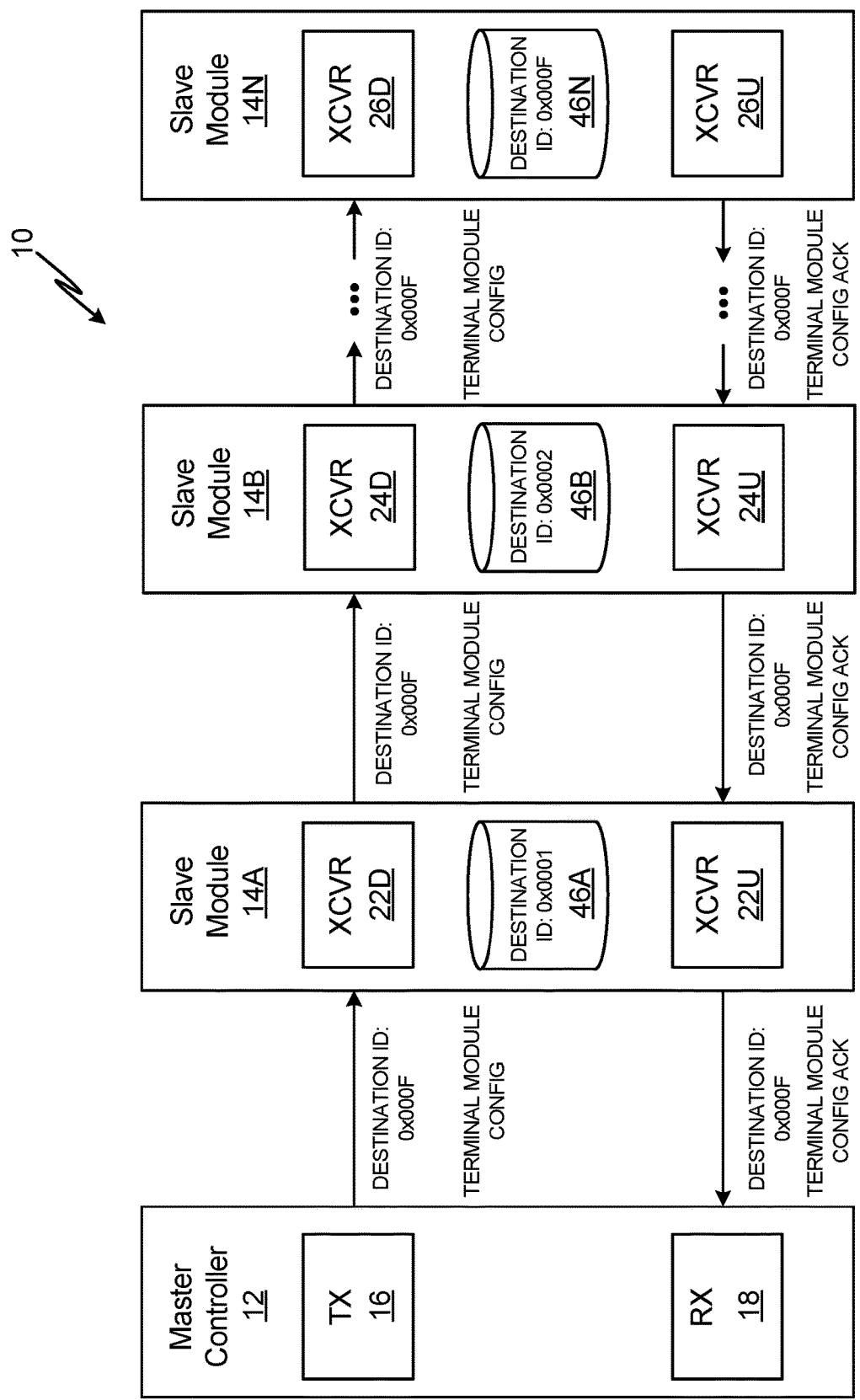

As illustrated in FIG. 4E, in response to determining that slave module 14N is a terminal slave module in communication system 10, master controller 12 transmits an identification class message downstream, the identification class message including a destination ID corresponding to slave module 14N (0x000F) and a terminal module configuration command. The identification class message, having the destination ID that does not match either of slave modules 14A or 14B, is transmitted downstream through slave modules 14A and 14B to slave module 14N.

In response to receiving the identification class message including the destination ID that matches destination ID 46N (0x000F) and the terminal module configuration command, slave module 14N reconfigures to operate as a terminal slave module. As such, slave module 14N is configured within communication system 10 to generate return messages in response to receiving downstream command messages, and to transmit the return messages upstream toward master controller 12.

Accordingly, master controller 12 can determine an identity of each of slave modules 14A-14N and a relative order of the serial connections of slave modules 14A-14N within communication system 10. As such, any type, number, and order of slave modules can be connected in series with master controller 12 without pre-provisioning slave modules 14A-14N or master controller 12 with the slave module types, the number of slave modules, or the connection order of the slave modules within communication system 10.

Communication system 10, implementing techniques of this disclosure, can enable high speed communication of large data packets between a master controller device and a plurality of slave modules over low voltage connections that facilitate intrinsic safety within an industrial process that may involve combustible fumes or other hazardous materials. The use of a communication schedule, which can be stored by the master controller and each of the slave modules, enables messages to be associated with multiple slave modules without requiring identification information for each slave module associated with each message to be included in the header information. Moreover, the use of the communication schedule can enable slave modules to efficiently identify and, in certain examples, anticipate the messages, thereby enabling quick response times by the slave modules to decrease processing latency of the system. As such, techniques of this disclose can enable high speed communications by decreasing system processing latency and increasing available bandwidth in a communication system that may be used with an industrial process that requires intrinsic safety of system components.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A communications system for an industrial process, the communications system comprising:
    a master controller; and
    a plurality of slave modules connected in series with the master controller, the plurality of slave modules comprising:
        an initial slave module; and
        a terminal slave module;
    wherein the master controller is configured to:
        store a communication schedule that defines an ordered sequence of messages and identifiers associated with each of the messages;
        transmit the messages with the identifiers in a downstream direction through the initial slave module to the terminal slave module according to the communication schedule; and
        receive return messages originating from the terminal slave module and transmitted by the terminal slave module in an upstream direction through the initial slave module to the master controller;
    wherein the initial slave module is configured to:
        receive downstream messages;
        identify, based on the identifiers included in the downstream messages, whether the downstream messages are associated with response information from the initial slave module; and
        insert the response information into upstream messages having identifiers corresponding to the message identifiers in the downstream messages; and
    wherein the terminal slave module is configured to:
        receive the downstream messages;
        generate the upstream messages having the identifiers that correspond to the identifiers included in the downstream messages; and
        transmit the upstream messages in the upstream direction;
    wherein the identifiers associated with each of the messages comprise schedule identifiers indicating locations of the messages within the ordered sequence of messages defined by the communication schedule;
    wherein each of the plurality of slave modules stores the communication schedule; and
    wherein each of the plurality of slave modules is configured to identify whether the downstream messages are associated with response information from the respective slave module based on a comparison of the schedule identifications with the communication schedule stored at the respective slave module.

2. The communications system of claim 1,
    wherein the plurality of slave modules further include one or more intermediate slave modules connected between the initial slave module and the terminal slave module;
    wherein the master controller is configured to:
        transmit the messages with the identifiers in the downstream direction through the initial slave module and the one or more intermediate slave modules to the terminal slave module according to the communication schedule; and
        receive the return messages originating from the terminal slave module and transmitted by the terminal slave module in the upstream direction through the one or more intermediate slave modules and the initial slave module to the master controller; and
    wherein the one or more intermediate slave modules are configured to:
        receive the downstream messages;
        identify, based on the identifiers included in the downstream messages, whether the downstream messages are associated with response information from the respective slave module; and
        insert the response information into the upstream messages having identifiers corresponding to the message identifiers in the downstream messages.

3. The communications system of claim 1,
    wherein each of the plurality of slave modules comprises:
        a first transceiver configured to receive and transmit the downstream messages; and
        a second transceiver configured to receive and transmit the upstream messages.

4. The communications system of claim 1,
wherein the terminal slave module is further configured to:
  identify, based on the message identifiers included in the downstream messages, whether the downstream messages are associated with response information from the terminal slave module; and
  insert the response information into the upstream messages having the message identifiers that correspond to the downstream messages.

5. The communications system of claim 1,
wherein the communication schedule further defines, for each of the plurality of slave modules:
  a local memory address for each of the downstream messages associated with the respective slave module;
  a size of each of the downstream messages associated with the respective slave module;
  a memory offset value within the downstream messages associated with the respective slave module at which information corresponding to the respective slave module is located within the downstream messages; and
  a memory offset value within upstream messages at which the respective slave module is to insert response information into the upstream messages.

6. The communications system of claim 1,
wherein the master controller is configured to transmit the communication schedule to each of the plurality of slave modules.

7. The communications system of claim 1,
wherein the master controller is configured to determine the communication schedule.

8. The communications system of claim 1,
wherein the master controller is configured to transmit the identifiers associated with the messages as message headers, the messages further including message payload information corresponding to one or more of the plurality of slave modules.

9. The communications system of claim 1,
wherein the master controller is configured to identify a relative order of the plurality of slave modules in the series connection and identity of each of the slave modules during an initialization phase of the communications system.

10. The communications system of claim 9,
wherein each of the plurality of slave modules is pre-provisioned to store, within computer-readable memory of the respective slave module, a location identifier having a value defined as corresponding to an uninitialized slave module; and
wherein the master controller is configured to identify the relative order and the identity of each of the slave modules by iteratively:
  transmitting, in a downstream direction, an identification class message that includes:
    a location identifier having the value defined as corresponding to the uninitialized slave module; and
    a commanded location identifier; and
  identifying, as next in the relative order of the plurality of slave modules in the series connection, a respective one of the plurality of slave modules corresponding to identity information received in an upstream identification class message.

11. A method for communicating in a communication system that includes a master controller and a plurality of slave modules connected in series with the master controller, the method comprising:
  transmitting, according to a communication schedule stored in memory of the master controller, downstream messages and identifiers of the downstream messages in a downstream direction from the master controller through an initial slave module to a terminal slave module;
  receiving the downstream messages at each of the plurality of slave modules as the messages are passed downstream;
  identifying, by each of the plurality of slave modules based on the identifiers included in the downstream messages, downstream messages that are associated with response information from the respective slave module;
  receiving the downstream messages at the terminal slave module;
  generating, by the terminal slave module, upstream messages having identifiers that correspond to the identifiers included in the downstream messages;
  transmitting the upstream messages from the terminal slave module in an upstream direction through the initial slave module to the master controller;
  inserting, by the plurality of slave modules, the response information into upstream messages having identifiers corresponding to the downstream messages identified as associated with response information from the respective slave module; and
  receiving the upstream messages at the master controller;
wherein the identifiers associated with each of the messages comprise schedule identifications indicating locations of the messages within the ordered sequence of messages defined by the communication schedule;
wherein each of the plurality of slave modules stores the communication schedule in computer-readable memory; and
wherein identifying, by each of the plurality of slave modules based on the identifiers included in the downstream messages, downstream messages that are associated with response information from the respective slave module comprises identifying, by each of the plurality of slave modules, the downstream messages that are associated with response information from the respective slave module based on a comparison of the schedule identifications with the communication schedule stored in the computer-readable memory of the respective slave module.

12. The method of claim 11,
wherein transmitting the downstream messages and the identifiers of the downstream messages in the downstream direction from the master controller through the initial slave module to the terminal slave module comprises transmitting the downstream messages and the identifiers of the downstream messages in the downstream direction from the master controller through the initial slave module and one or more intermediate slave modules connected between the initial slave module and the terminal slave module to the terminal slave module; and
wherein transmitting the upstream messages from the terminal slave module in the upstream direction through the initial slave module to the master controller comprises transmitting the upstream messages from the terminal slave module in the upstream direction through the one or more intermediate slave modules and the initial slave module to the master controller.

13. The method of claim 11,
wherein receiving and transmitting the downstream messages by each of the plurality of slave modules comprises receiving and transmitting the downstream messages using a first transceiver of a respective one of the plurality of slave modules; and
wherein receiving and transmitting the upstream messages by the plurality of slave modules comprises receiving and transmitting the upstream messages using a second transceiver of a respective one of the plurality of slave modules.

14. The method of claim 11,
wherein the communication schedule further defines, for each of the plurality of slave modules:
a local memory address for each of the downstream messages associated with the respective slave module;
a size of each of the downstream messages associated with the respective slave module;
a memory offset value within the downstream messages associated with the respective slave module at which information corresponding to the respective slave module is located within the downstream messages; and
a memory offset value within upstream messages at which the respective slave module is to insert response information into the upstream messages.

15. The method of claim 11, further comprising:
transmitting the communication schedule from the master controller to each of the plurality of slave modules.

16. The method of claim 11, further comprising:
determining the communication schedule by the master controller.

17. The method of claim 11, further comprising:
identifying, by the master controller during an initialization phase of the communication system, a relative order of the plurality of slave modules in the series connection and identity of each of the plurality of slave modules.

18. The method of claim 17,
wherein each of the plurality of slave modules is pre-provisioned to store, within computer-readable memory of the respective slave module, a location identifier having a value defined as corresponding to an uninitialized slave module; and
wherein the identifying the relative order of the plurality of slave modules in the series connection and identity of each of the plurality of slave modules comprises iteratively:
transmitting, in a downstream direction, an identification class message that includes:
a location identifier having the value defined as corresponding to the uninitialized slave module; and
a commanded location identifier; and
identifying, as next in the relative order the plurality of slave modules in the series connection, a respective one of the plurality of slave modules corresponding to identity information received in an upstream identification class message.

19. A communications system for an industrial process, the communications system comprising:
a master controller; and
a plurality of slave modules connected in series with the master controller, the plurality of slave modules comprising:
an initial slave module; and
a terminal slave module;
wherein the master controller is configured to:
store a communication schedule that defines an ordered sequence of messages and identifiers associated with each of the messages;
transmit the messages with the identifiers in a downstream direction through the initial slave module to the terminal slave module according to the communication schedule; and
receive return messages originating from the terminal slave module and transmitted by the terminal slave module in an upstream direction through the initial slave module to the master controller;
wherein the initial slave module is configured to:
receive downstream messages;
identify, based on the identifiers included in the downstream messages, whether the downstream messages are associated with response information from the initial slave module; and
insert the response information into upstream messages having identifiers corresponding to the message identifiers in the downstream messages; and
wherein the terminal slave module is configured to:
receive the downstream messages;
generate the upstream messages having the identifiers that correspond to the identifiers included in the downstream messages; and
transmit the upstream messages in the upstream direction;
wherein the master controller is configured to identify a relative order of the plurality of slave modules in the series connection and identity of each of the slave modules during an initialization phase of the communications system;
wherein each of the plurality of slave modules is pre-provisioned to store, within computer-readable memory of the respective slave module, a location identifier having a value defined as corresponding to an uninitialized slave module; and
wherein the master controller is configured to identify the relative order and the identity of each of the slave modules by iteratively:
transmitting, in a downstream direction, an identification class message that includes:
a location identifier having the value defined as corresponding to the uninitialized slave module; and
a commanded location identifier; and
identifying, as next in the relative order of the plurality of slave modules in the series connection, a respective one of the plurality of slave modules corresponding to identity information received in an upstream identification class message.

20. A method for communicating in a communication system that includes a master controller and a plurality of slave modules connected in series with the master controller, the method comprising:
identifying, by the master controller during an initialization phase of the communication system, a relative order of the plurality of slave modules in the series connection and identity of each of the plurality of slave modules;

transmitting, according to a communication schedule stored in memory of the master controller, downstream messages and identifiers of the downstream messages in a downstream direction from the master controller through an initial slave module to a terminal slave module;

receiving the downstream messages at each of the plurality of slave modules as the messages are passed downstream;

identifying, by each of the plurality of slave modules based on the identifiers included in the downstream messages, downstream messages that are associated with response information from the respective slave module;

receiving the downstream messages at the terminal slave module;

generating, by the terminal slave module, upstream messages having identifiers that correspond to the identifiers included in the downstream messages;

transmitting the upstream messages from the terminal slave module in an upstream direction through the initial slave module to the master controller;

inserting, by the plurality of slave modules, the response information into upstream messages having identifiers corresponding to the downstream messages identified as associated with response information from the respective slave module; and receiving the upstream messages at the master controller;

wherein each of the plurality of slave modules is pre-provisioned to store, within computer-readable memory of the respective slave module, a location identifier having a value defined as corresponding to an uninitialized slave module; and wherein the identifying the relative order of the plurality of slave modules in the series connection and identity of each of the plurality of slave modules comprises iteratively:

transmitting, in a downstream direction, an identification class message that includes:
  a location identifier having the value defined as corresponding to the uninitialized slave module; and
  a commanded location identifier; and identifying, as next in the relative order the plurality of slave modules in the series connection, a respective one of the plurality of slave modules corresponding to identity information received in an upstream identification class message.

* * * * *